United States Patent [19]

Kim et al.

[11] Patent Number: 5,714,553

[45] Date of Patent: Feb. 3, 1998

[54] APPARATUS FOR THE PREPARATION OF POLYESTER RESIN

[75] Inventors: Nam-Il Kim, Seoul; Seong-Ill Cheong, Suwon-si; Young-Jin Lee, Anyang-si, all of Rep. of Korea

[73] Assignee: SKC Limited, Kyungki-do, Rep. of Korea

[21] Appl. No.: 694,019

[22] Filed: Aug. 8, 1996

[30] Foreign Application Priority Data

Aug. 9, 1995 [KR] Rep. of Korea ............... 95-24540

[51] Int. Cl.$^6$ ............... C08F 2/20; C08G 85/00
[52] U.S. Cl. ............... 526/64; 526/64; 526/65; 526/71; 528/272
[58] Field of Search ............... 526/64, 65, 71; 528/272

[56] References Cited

U.S. PATENT DOCUMENTS

| | | | |
|---|---|---|---|
| 5,571,655 | 11/1996 | Mahabadi et al. | 430/137 |
| 5,597,891 | 1/1997 | Nelson et al. | 528/481 |
| 5,601,780 | 2/1997 | Occhiello et al. | 264/523 |
| 5,616,680 | 4/1997 | Linstid, III | 528/183 |

*Primary Examiner*—Samuel A. Acquah
*Attorney, Agent, or Firm*—Anderson, Kill, & Olick, P.C.

[57] ABSTRACT

Apparatus for preparing a polyester resin by polymerizing a monomer produced by transesterifying a dicarboxylic acid component with a diol component while removing the vapor containing diols and other low molecular weight compound released during the polymerization, which comprises:

a polymerization reactor;

a condenser having an inlet, a heat exchanger and an outlet, the inlet being located below the heat exchanger and connected to the polymerization reactor while the outlet being positioned above the heat exchanger;

a baffle installed between the inlet and the heat exchanger of the condenser such that the flow of the vapor is directed toward the bottom of the condenser;

a trap located below the condenser to collect the condensate of the vapor; and a vacuum pump connected to the outlet of the condenser.

6 Claims, 3 Drawing Sheets

5,714,553

APPARATUS FOR THE PREPARATION OF POLYESTER RESIN

FIELD OF THE INVENTION

The present invention relates to an apparatus for the preparation of a polyester resin; and more particularly, to an apparatus which is capable of shortening the polymerization cycle time.

BACKGROUND OF THE INVENTION

Polyesters such as polyethylene terephthalate, are known to possess good chemical and physical stability, high mechanical strength, excellent durability, heat and chemical resistance and electrical insulation properties; and, therefore, have been widely used as magnetic recording media, condensers, photographic films, industrial products, packaging and labelling materials and the like.

Polyester resins are generally prepared by a transesterification method, and this method comprises the steps of: i) transesterifying a dicarboxylic acid component such as dimethylterephthalate with a diol component such as ethyleneglycol in a first reactor to obtain a prepolymer composed of monomers and oligomers; and then ii) polymerizing the prepolymer thus obtained in a second reactor at a temperature ranging from 270° to 290° C. and under a pressure of 0.1 torr or less while removing diol and other low molecular compounds as the polymerization reaction proceeds.

When the intrinsic viscosity of the polyester resin reaches 0.3 dl/g or more in the polymerization step, the mass transfer rate becomes the limiting factor and various methods have been attempted to enhance the mass transfer rate and to continue the progress of the polymerization reaction.

One such method is to increase the specific surface area of the reaction mixture by way of optimizing the rotating speed and configuration of the stirrer, the reaction temperature, and the configuration of the reactor. Another method is to maintain the pressure in a polymerization reactor at a low level so that the diol component and other low molecular weight compound can be continuously removed from the reactor, thereby enhancing the degree of polymerization.

FIG. 1 shows a schematic illustration of a conventional system for maintaining a reduced pressure in a polymerization reactor; the inner pressure of the reactor 1 is reduced by the action of a vacuum pump 5 to remove the diol and other components from the reaction mixture. That is, the vapor composed of the diol and other components generated in reactor 1 flows into a condenser 2 equipped with a heat exchanger 6. When the vapor contacts the heat exchanger 6 which is cooled by a circulating cryogenic liquid introduced from an inlet 7 and exiting through an outlet 8, the diol and other components condense and accumulate in a trap 3.

However, the top of the heat exchanger of this conventional system may be easily plugged, causing a pressure increase in reactor 1. The vapor generated in the reactor comprises diols such as ethylene glycol and diethylene glycol as well as a significant amount of monomers and oligomers which can easily evaporate under the polymerization condition. Portions of such monomers and oligomers often solidify on top of the heat exchanger, and eventually plug the tubes. This induces a pressure rise within the reactor, and lowers the rate of diol removal, leading to an increase in the polymerization time.

Therefore, the solid substances accumulated on top of the heat exchanger must be removed periodically, often after interrupting a polymerization cycle. This lowers the productivity of the polymerization process.

SUMMARY OF THE INVENTION

It is, therefore, a primary object of the present invention to provide a method for preparing a polyester resin which is effective in shortening the polymerization time.

It is another object of the present invention to provide an apparatus which makes it possible to maintain a reduced pressure in a polymerization reactor over an extended polymerization cycle time.

BRIEF DESCRIPTION OF THE DRAWINGS

The above and other objects and features of the present invention will become apparent from the following description of the invention, when taken in conjunction with the accompanying drawings, in which.

DETAILED DESCRIPTION OF THE INVENTION

In accordance with the present invention, there is provided apparatus for preparing a polyester resin by polymerizing a monomer produced by transesterifying a dicarboxylic acid component with a diol component while removing the vapor containing diols and other low molecular weight compounds released during the polymerization reaction, which comprises:

a polymerization reactor;

a condenser having an inlet, a heat exchanger and an outlet, the inlet being located below the heat exchanger and connected to the polymerization reactor while the outlet being positioned above the heat exchanger;

a baffle installed between the inlet and the heat exchanger of the condenser such that the flow of the vapor is directed toward the bottom of the condenser;

a trap located below the condenser to collect the condensate of the vapor; and a vacuum pump connected to the outlet of the condenser.

In accordance with the present invention, there is provided a method for preparing a polyester resin using the above apparatus.

Representatives of the dicarboxylic acid component include: dimethyl terephthalate, terephthalic acid, isophthalic acid, naphthalene dicarboxylic acid, cyclohexane dicarboxylic acid, diphenoxyethane dicarboxylic acid, diphenyl dicarboxylic acid, diphenyl ether dicarboxylic acid, anthracene dicarboxylic acid and $\alpha,\beta$-bis(2-cholorophenoxy) ethane-4,4'-dicarboxylic acid, and esters thereof. Among them, dimethyl terephthalate and terephthalic acid are most preferred.

Exemplary diol component includes: ethylene glycol, trimethylene glycol, tetramethylene glycol, pentamethylene glycol, hexamethylene glycol and hexylene glycol. Among them, ethylene glycol is most preferred.

The feature of the present invention resides at the ability of the inventive apparatus in sustaining a reduced pressure in the polymerization reactor over many polymerization cycles.

The method of the present invention will be described in detail in connection with the preferable embodiment of the apparatus for carrying out the method.

Figure 2:
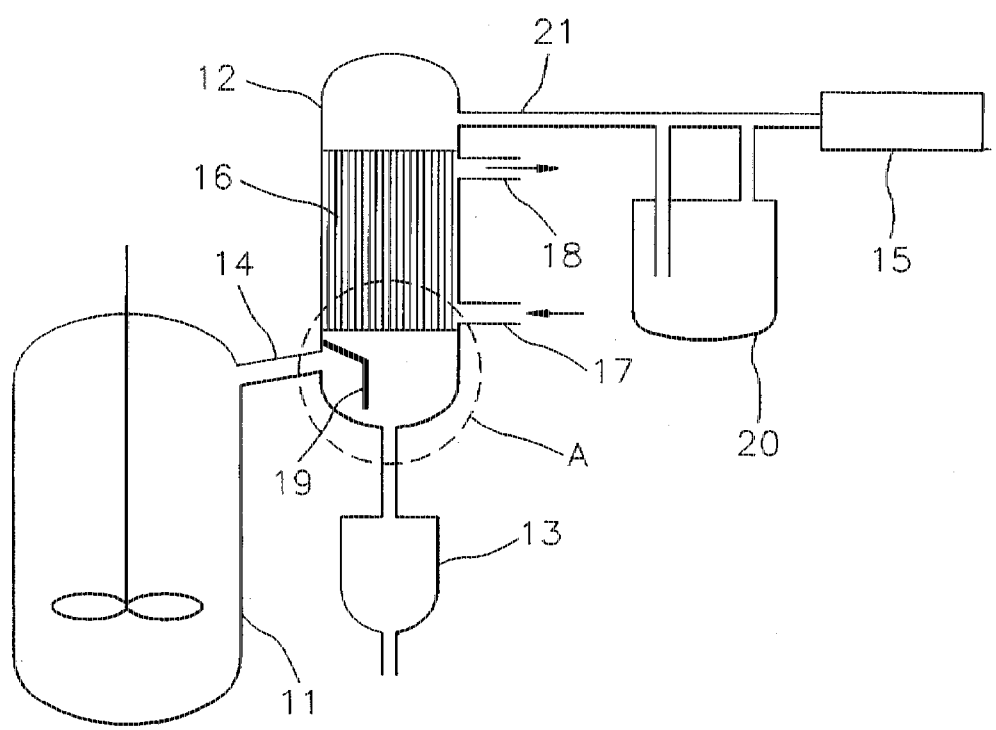
FIG. 2 depicts a schematic view of the reactor system of the present invention which is capable of sustaining a low reactor pressure over a prolonged reactor cycle time.

FIG. 2 depicts a schematic view of the inventive reactor system for maintaining a reduced pressure within a polymerization reactor 11. An inlet 14 is located at the lower part of a condenser 12 equipped with a heat exchanger 16. A baffle 19 is positioned above the inlet 14 and an outlet 21 is located on the upper part of the condenser 12. The heat exchanger 16 is located between the baffle 19 and the outlet 21. A vacuum pump 15 is connected to the outlet 21 through a pipe. A first trap 13 is located below the condenser 12 and a second trap 20 is positioned on the pipe between the outlet 21 and the vacuum pump 15.

A vapor consisting of diols and other byproducts generated from the polymerization mixture in the reactor 11 is introduced through the inlet 14 by the action of the vacuum pump 15 into the condenser, wherein the baffle 19 changes the direction of the vapor flow downward.

Figure 3:
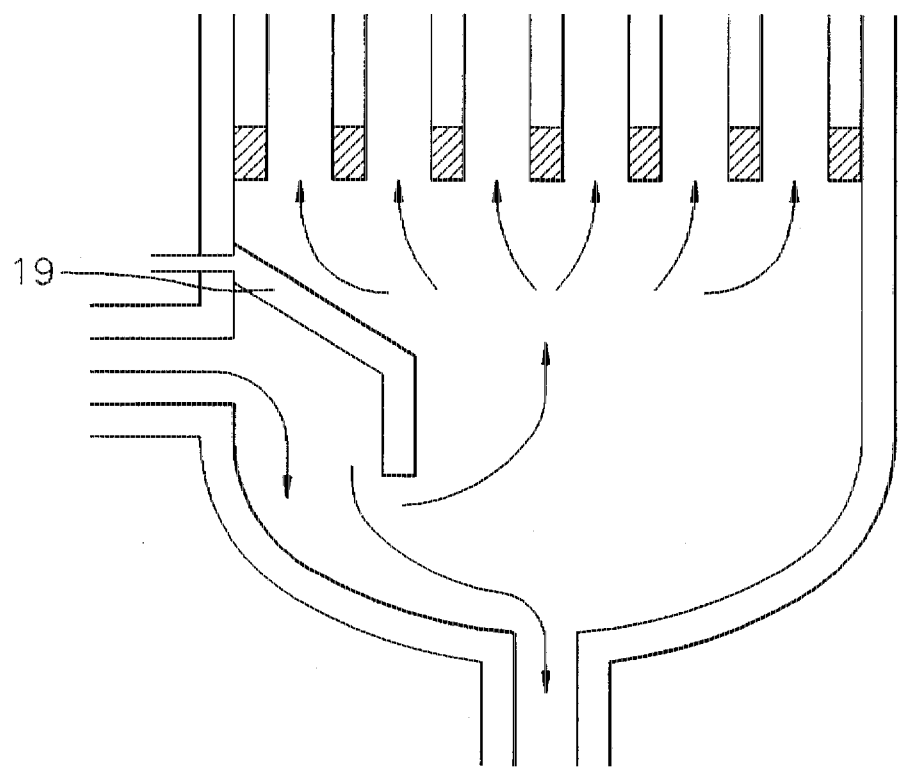
FIG. 3 displays an enlarged view of part A in FIG. 2.
Figure 4:
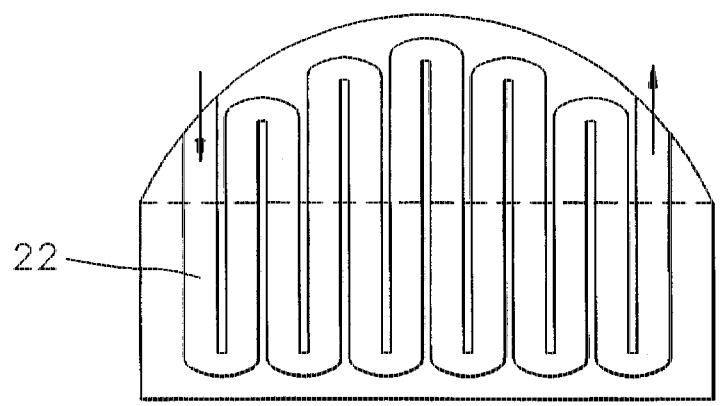
FIG. 4 illustrates a schematic diagram of the baffle in accordance with one embodiment of the present invention.

FIG. 3 displays an enlarged view of part A shown in FIG. 2. In FIG. 3, the flow direction of the vapor introduced through inlet 14 is represented by arrows. The flow of the vapor introduced into the condenser 12 through the inlet 14 is guided by the baffle 19 into a downward direction and the vapor is cooled at and around the baffle. A portion of the vapor condenses, and the condensate thus formed is collected in the first trap 13. In accordance with one preferred embodiment of this invention, the baffle 19 is equipped with an inner cooling tube 22 as shown in FIG. 4, wherein a cryogenic liquid flows along the direction of the arrow.

After passing through the heat exchanger 16, the vapor containing such materials as ethylene glycol and diethylene glycol leaves through the outlet 21 and condenses in the second trap 20.

The following Example are intended to illustrate the present invention more specifically, without limiting the scope of the invention.

EXAMPLE 1

8000 g of dimethylterephthalate, ethylene glycol 5300 g and 4 g of zinc acetate were added to a reactor equipped with a stainless steel stirrer under a nitrogen atmosphere at a reactor temperature of 150° C. Then, transesterification was conducted while elevating the temperature slowly to 220° C. for 2 hours.

The product thus obtained was added into a reactor system similar to that shown in FIG. 2 and stirred for 10 minutes while purging the reactor with nitrogen. Then, the reactor pressure was maintained at 0.1 torr and the reacting mixture was heated at 290° C. until a polyester resin having an intrinsic viscosity of 0.6 dl/g was obtained.

The above procedure was repeated 20 times and the reactor pressure as well as the polymerization time were measured, for each polymerization cycle.

Figure 5:
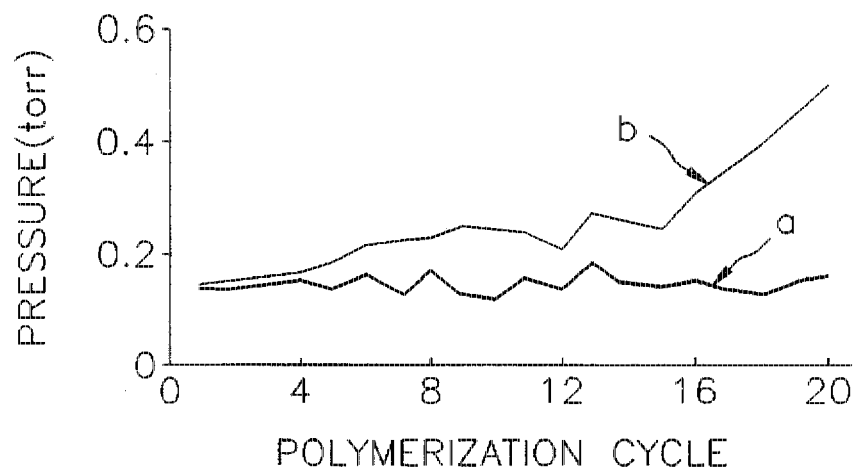
FIG. 5 represents the variation in the reactor pressure with the polymerization cycle time.
Figure 6:
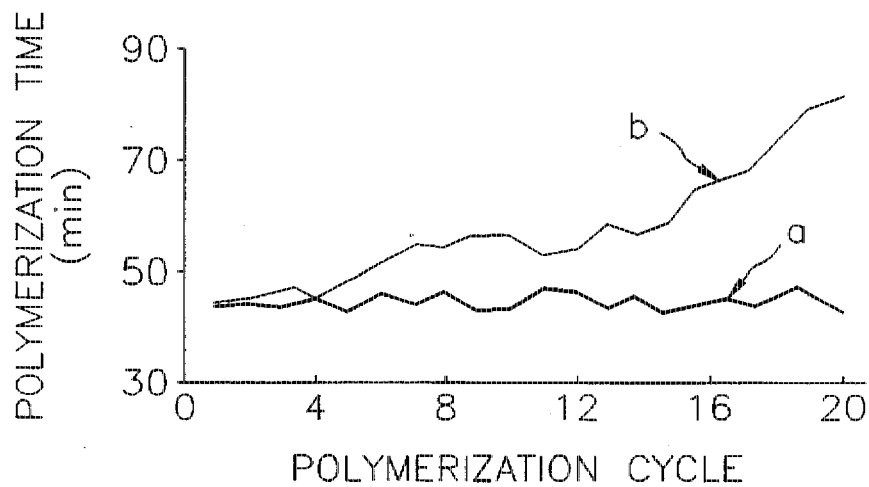
FIG. 6 shows the variation in the polymerization time with the polymerization cycle time.

The results are shown in FIGS. 5 and 6 by curve a.

As shown in FIGS. 5 and 6, the reactor pressure and the polymerization time remained constant throughout the 20 polymerization cycles.

COMPARATIVE EXAMPLE 1

Figure 1:
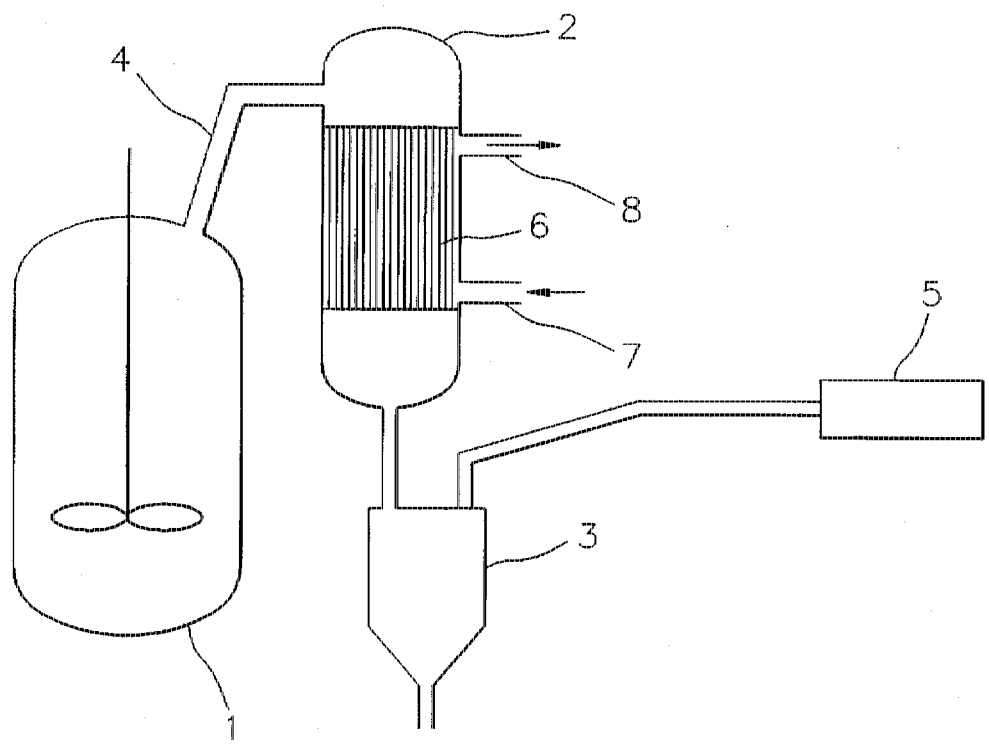
FIG. 1 shows a schematic illustration of a conventional reactor system for maintaining a reduced pressure in the reactor.

The procedure of Example 1 was repeated except that the reactor system of FIG. 1 was used this comparative example.

While repeating 20 polymerization cycles, and the reactor pressure as well as the polymerization time were measured for each cycle.

The results are represented by curve b in FIGS. 5 and 6.

As shown in the FIGS. 5 and 6, both the reactor pressure and the polymerization time increase markedly with increasing cycle time.

As the above results show, a polyester resin can be prepared more efficiently when the process in accordance with the present invention is employed instead of the conventional process.

While the invention has been described with respect to the specific embodiments, it should be recognized that various modifications and changes may be made by those skilled in the art to the invention which also fall within the scope of the invention as defined by the appended claims.

What is claimed is:

1. Apparatus for preparing a polyester resin by polymerizing a monomer produced by transesterifying a dicarboxylic acid component with a diol component while removing the vapor containing diols and other low molecular weight compound released during the polymerization, which comprises:

a polymerization reactor;

a condenser having an inlet, a heat exchanger and an outlet, the inlet being located below the heat exchanger and connected to the polymerization reactor while the outlet being positioned above the heat exchanger;

a baffle installed between the inlet and the heat exchanger of the condenser such that the flow of the vapor is directed toward the bottom of the condenser;

a trap located below the condenser to collect the condensate of the vapor; and a vacuum pump connected to the outlet of the condenser.

2. The apparatus of claim 1 which further comprises a second trap located between the outlet of the condenser and the vacuum pump.

3. The apparatus of claim 1 wherein the baffle has a cooling tube.

4. A method for preparing a polyester resin using the apparatus of claim 1.

5. The method of claim 4 wherein the apparatus further comprises a second trap located between the outlet of the condenser and the vacuum pump.

6. The method of claim 4 wherein the baffle has a cooling tube.

* * * * *